July 29, 1969   F. X. SCHÖPFEL   3,457,913
DEVICE FOR THE MASSAGE AND TREATMENT OF THE SCALP
Filed Sept. 29, 1966   15 Sheets-Sheet 1

INVENTOR
FRANZ XAVER SCHÖPFEL
BY
ATTORNEY

July 29, 1969      F. X. SCHÖPFEL      3,457,913
DEVICE FOR THE MASSAGE AND TREATMENT OF THE SCALP
Filed Sept. 29, 1966      15 Sheets-Sheet 2

INVENTOR
FRANZ XAVER SCHÖPFEL
BY Edward T. Connors
ATTORNEY

July 29, 1969 F. X. SCHÖPFEL 3,457,913
DEVICE FOR THE MASSAGE AND TREATMENT OF THE SCALP
Filed Sept. 29, 1966 15 Sheets-Sheet 3

INVENTOR
FRANZ XAVER SCHÖPFEL
BY Edward T. Connors
ATTORNEY

July 29, 1969  F. X. SCHÖPFEL  3,457,913
DEVICE FOR THE MASSAGE AND TREATMENT OF THE SCALP
Filed Sept. 29, 1966  15 Sheets-Sheet 6

INVENTOR
FRANZ XAVER SCHÖPFEL
BY
ATTORNEY

July 29, 1969   F. X. SCHÖPFEL   3,457,913
DEVICE FOR THE MASSAGE AND TREATMENT OF THE SCALP
Filed Sept. 29, 1966   15 Sheets-Sheet 7

INVENTOR
FRANZ XAVER SCHÖPFEL
BY
ATTORNEY

INVENTOR
FRANZ XAVER SCHÖPFEL
BY
ATTORNEY

July 29, 1969          F. X. SCHÖPFEL          3,457,913
DEVICE FOR THE MASSAGE AND TREATMENT OF THE SCALP
Filed Sept. 29, 1966          15 Sheets-Sheet 12

FIG. 21

INVENTOR
FRANZ XAVER SCHÖPFEL
BY
ATTORNEY

United States Patent Office 3,457,913
Patented July 29, 1969

3,457,913
DEVICE FOR THE MASSAGE AND
TREATMENT OF THE SCALP
Franz Xaver Schöpfel, 22 Gerlichstrasse,
8000 Munich-Obermenzing, Germany
Filed Sept. 29, 1966, Ser. No. 583,004
Claims priority, application Germany, Sept. 29, 1965,
Sch 37,793; Mar. 29, 1966, Sch 38,759
Int. Cl. A61b 7/00
U.S. Cl. 128—64          2 Claims

ABSTRACT OF THE DISCLOSURE

A scalp treating device including a hood having a sealing ring at its rim opening. Within the hood are pneumatically actuated massage members which may be arranged to be operative from the side or from above, one embodiment of the hood being separable into upper and lower parts hinged together.

---

The present invention relates to a device for the massage and treatment of the scalp.

It is known that about 96% of all difficulties in the growth of hair of men and women are caused by fatty seborrhea resulting in loss of hair and baldness. The microbes causing the fatty seborrhea are carried to the scalp by dirty combs or brushes, and by irritation of the scalp by contaminated finger nails.

A scalp afflicted by fatty seborrhea is evidenced by itching. Scratching with a finger nail causes the accumulation thereunder of a fatty substance which is the stearin form the sabaceous glands pressed out of overfatty pores by the scratching. The excessive fat is present because the seborrhea secrete a fluid which enters the openings of the sebaceous glands at the hair follicles and thereby stimulate the sebaceous glands to excessive activity.

The scalp infection from a contaminated comb or brush generally starts in the hair line above the forehead and progressively travels backwards. The progress of the infection depends to some extent upon the pH value of the scalp and differs from individual to individual.

The methods so far used for treatment may be classified as follows:

(a) The washing of the hair and scalp with different shampoos;
(b) The rubbing of the scalp with different hair tonics and alcoholic essences;
(c) Scalp massage by hand during the washing of the hair or during the application of the tonics, etc.;
(d) Vibratory massage with electrical vibrators;
(e) Electrophoresis with battery devices.

As is generally known these methods generally are not adequate to correct the damage done by the microbes.

In order to keep a scalp healthy, to protect it against an attack of the microbes, and to free the scalp from the hair destroying microbes in case of an attack, the microbes living in the hair follicles must be reached and destroyed. This is not possible with the above mentioned methods for the reason that when shampoos, hair tonics, hair essences and so forth, however mild, are applied, the hair pores quickly become constricted upon being contacted.

The reason for this quick constriction of the hair pores can be found on the one hand in the biochemical behaviour of the scalp, which closes its pores instantly when there is danger of penetration of any chemical. On the other hand the reason can be found in a temperature difference.

It is known that the human skin and the scalp at temperatures below body temperature constricts its pores (with very great cold for instance the pores constrict so much that they make small elevations, the so-called goose pimples). Furthermore as is well known the pores open at temperatures higher than the normal body temperature.

In accordance with the present invention there is provided a hood having a sealing ring at its rim opening. Within the hood are massage members which may be positioned so as to be effective from the side or from above. The massage members are preferably activated pneumatically and the sealing ring preferably is an inflatable sealing tube. However, the sealing ring alternatively may be a non-inflatable elastic ring. According to one embodiment of the present invention, the hood is separable into upper and lower parts above the sealing ring and the lower part is provided with side hinges and an easily activatable clamp closure on its front side to facilitate placing the hood in position.

Figures 1, 2:
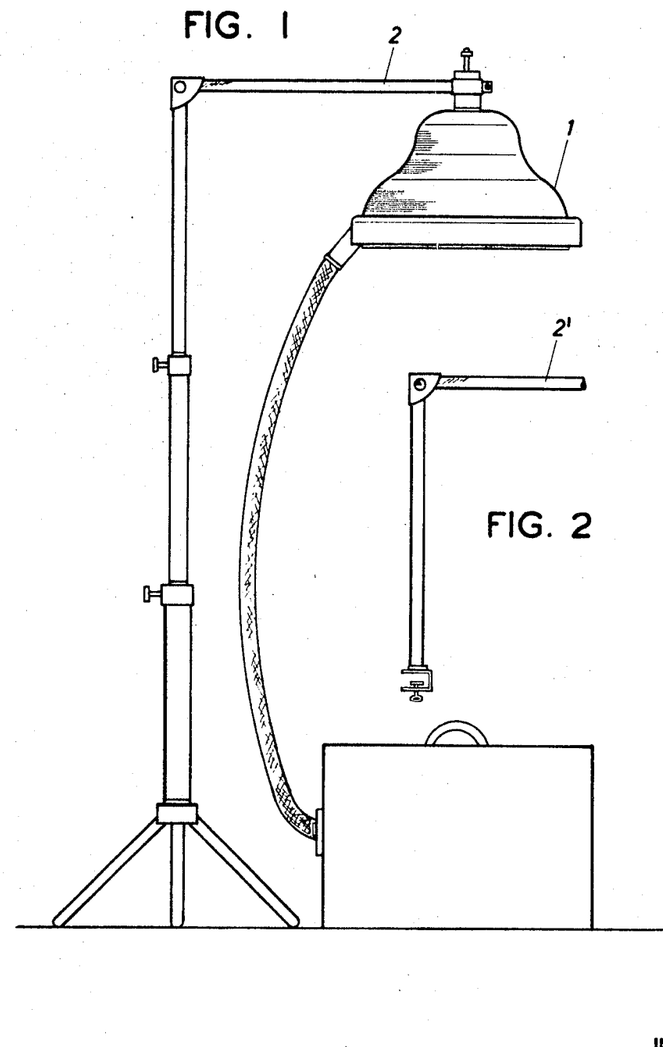
FIGURE 1 is a side view of a hood in accordance with the invention supported by a collapsible floor mounting.
FIGURE 2 is a detail of an alternate shelf or table mounting for the hood.

The hood 1 is supported by a collapsible frame 2 and within its lower rim is positioned an inflatable tube 3 shaped to seal the scalp. The tube 3 is made so that the formation of creases is avoided.

In order that the tube fit all head sizes without creasing it is inflated before being placed on the head. The tube walls thus lie flatly against the inner wall of the hood and the opening is adaptable to heads of various sizes. The hood is paced over the head so that it is above the ear lobes and about 2 centimeters above the eye brows. Because the tube is inflated, it fits in an air-tight manner without consideration as to the size of the head.

In order that pressure within the tube may be released so that the hood is comfortable, a release valve is provided which within certain limits is adjustable so that a predetermined pressure is not exceeded.

Because a smooth tube closely embracing the scalp would tend to block the flood flow whereby a so-called passive hyperemia is formed, the tube may be provided with a massage device. A ring of hemispheres 4, 4' (FIGURE 9) of elastic material such as rubber may be fastened to the inner side of the sealing tube 3 and alternately inflated and deflated so as to massage the scalp.

Figure 9:
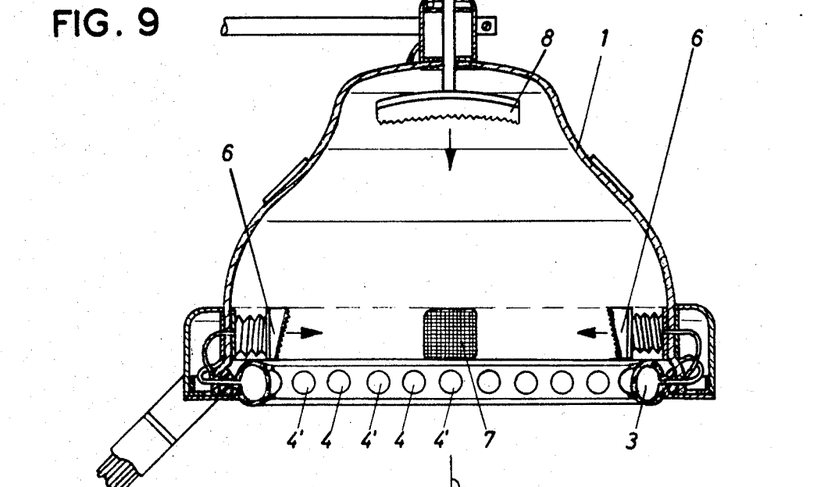
FIGURE 9 is a vertical sectional view of the hood of FIGURE 3 modified by a sealing ring with massage members positioned thereon.
Figure 10:
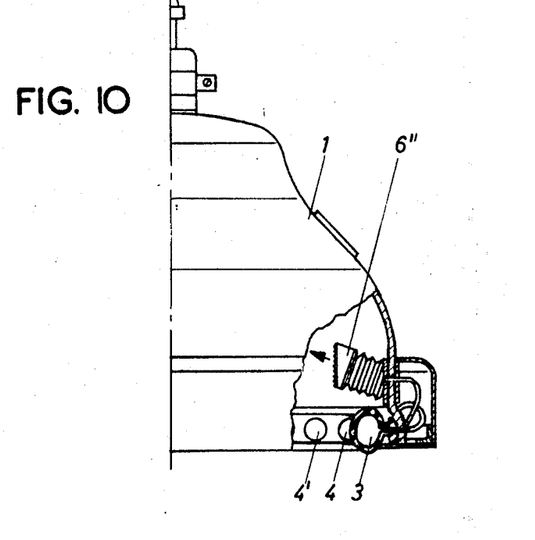
FIGURE 10 is a partial side view of the hood shown in FIGURE 9 with a broken away portion revealing a modified positioning of the side massage members.
Figure 11:
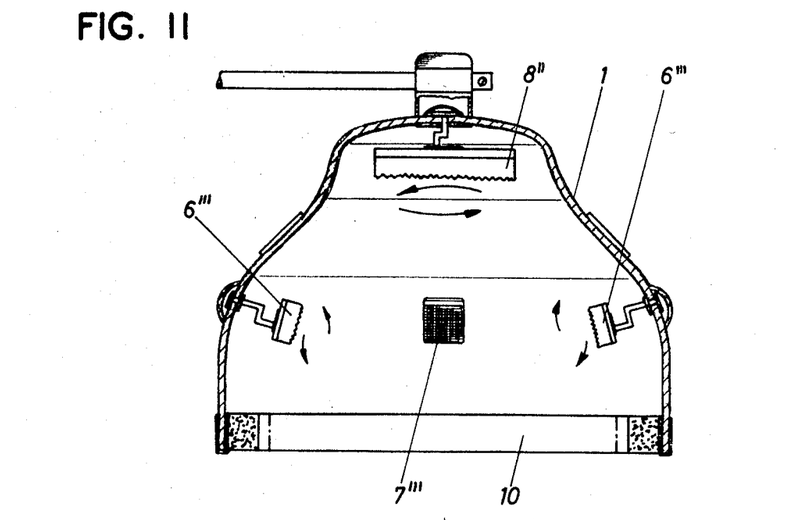
FIGURE 11 is a vertical sectional view of the hood showing a modified mounting for the massage members and rotating oscillating means for the same together with non-inflatable resilient sealing means.
Figure 12:
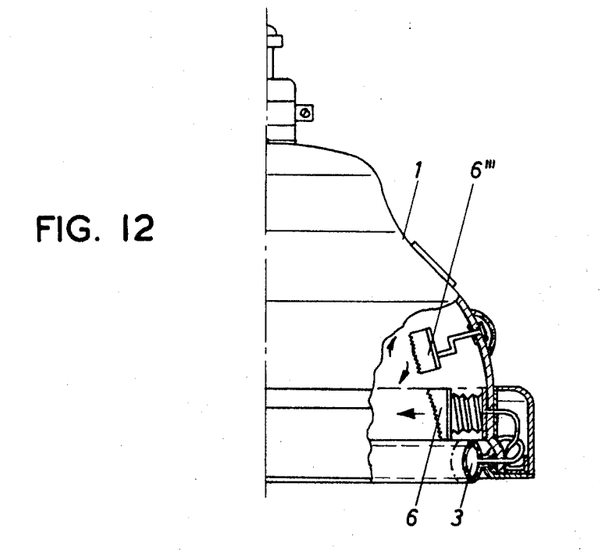
FIGURE 12 is a partial side view of the hood shown in FIGURE 11 with a broken away portion revealing a modification in which the constructions of FIGURES 11 and 3 are combined.
Figure 13:
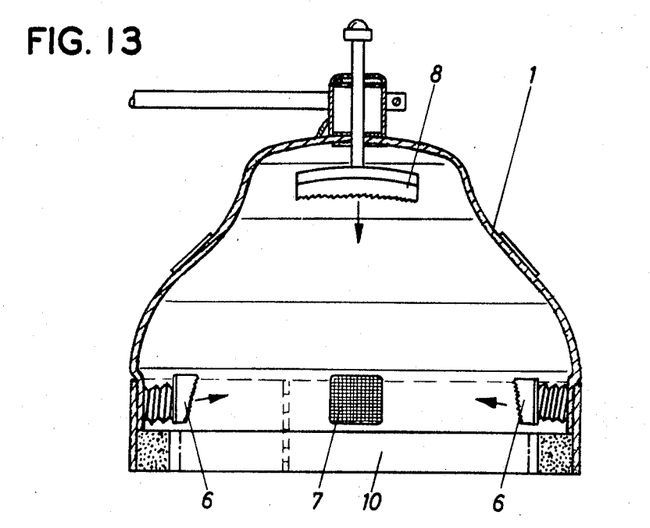
FIGURE 13 is a vertical sectional view of the hood corresponding to FIGURE 3 but with a sealing ring of resilient material, the hood being formed in upper and lower portions, the lower portion split vertically so as to be clamped around the head of the user.
Figure 14:
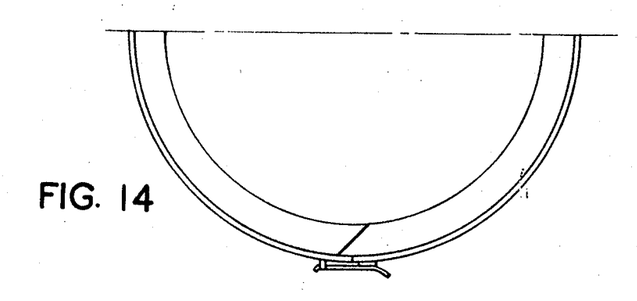
FIGURE 14 is a partial bottom view of the construction shown in FIGURE 13 and illustrating clamping means for the lower portion of the hood. Also shown is a joint in the resilient sealing ring.
Figure 14A:
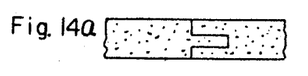
FIGURES 14a, 14b, 14c and 14d illustrate modified joint constructions for the resilient sealing ring of FIGURE 13.
Figure 14B:
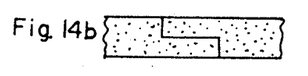
Figure 14C:
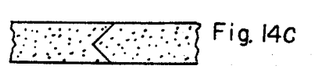
Figure 14D:
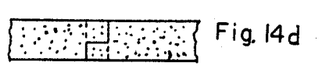
Figure 15:
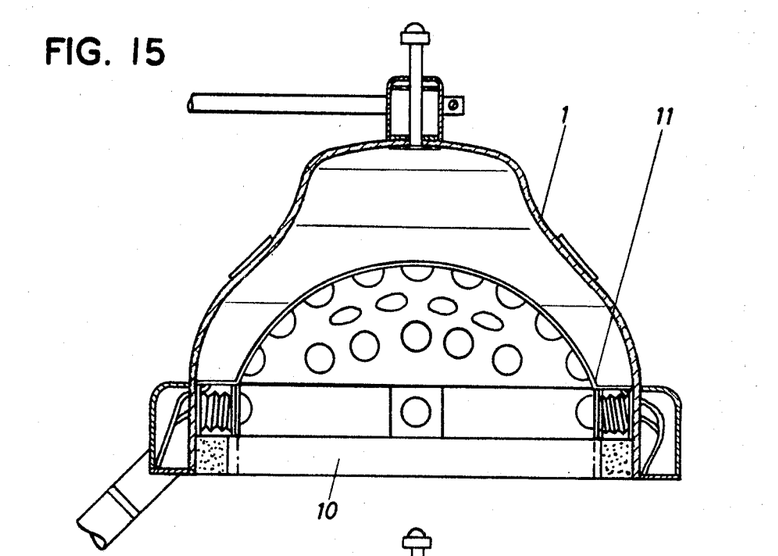
FIGURE 15 is a vertical sectional view of the hood showing a modified construction for the massage members.
Figure 16:
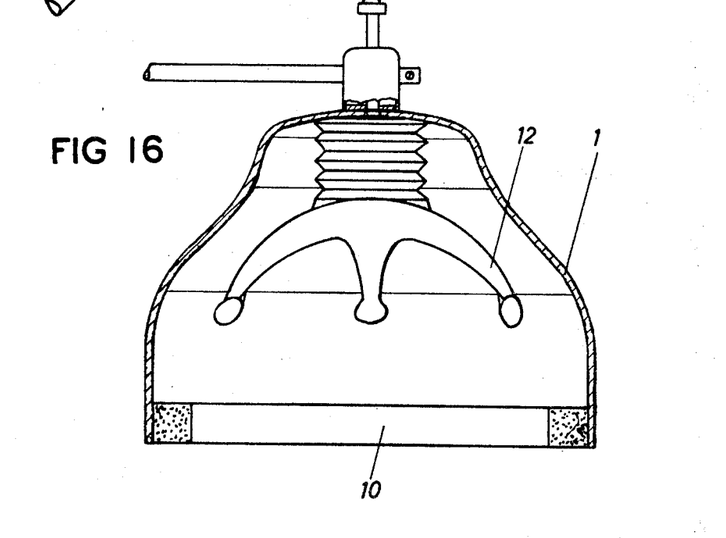
FIGURE 16 is a vertical sectional view of the hood showing a further modified construction of the massage members.
Figure 17:
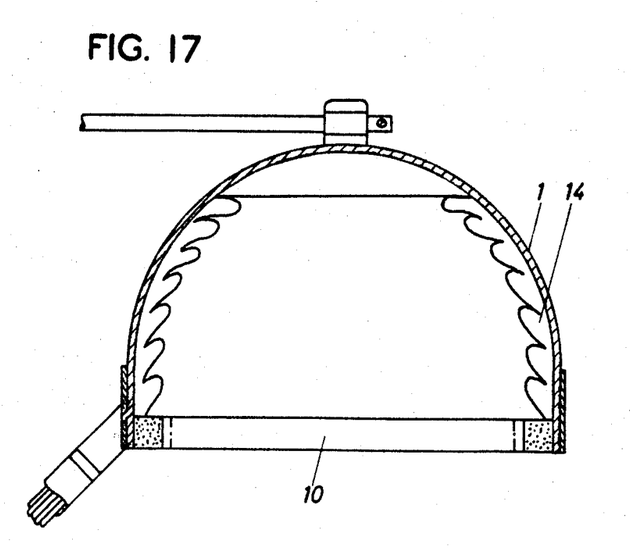
FIGURE 17 is a vertical sectional view of the hood showing a still further modified construction.
Figure 18:
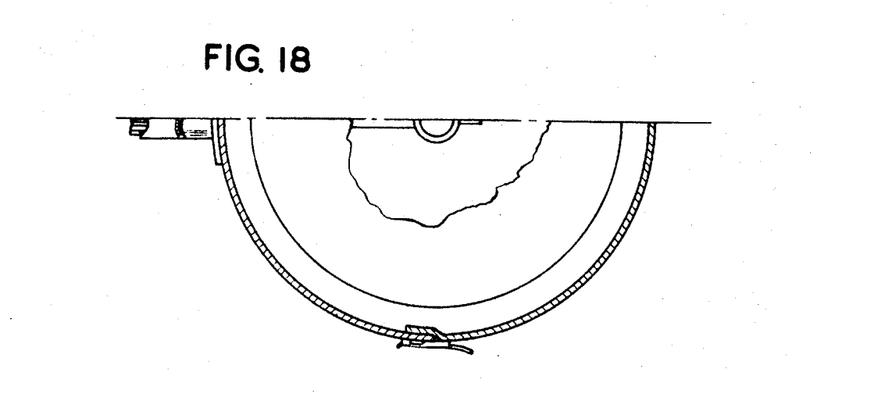
FIGURE 18 is a partial bottom view of the construction shown in FIGURE 17.
Figure 19:
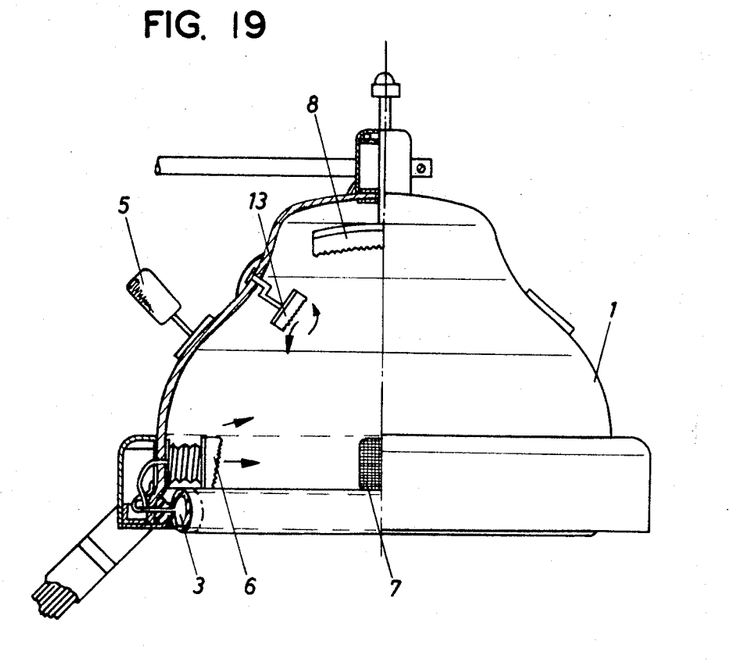
FIGURE 19 is a partial vertical sectional view of a modified hood.
Figure 20:
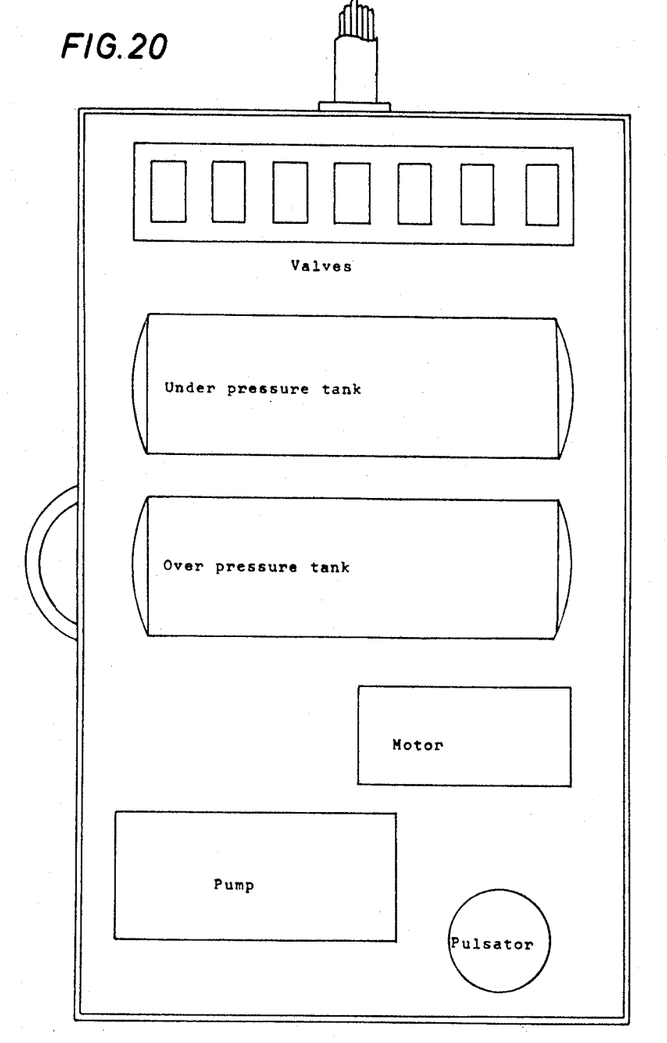
FIGURE 20 is a schematic layout of the various components including the pump, motor, pressurizing and depressurizing apparatus and a pulsator for the hood.
Figure 21:
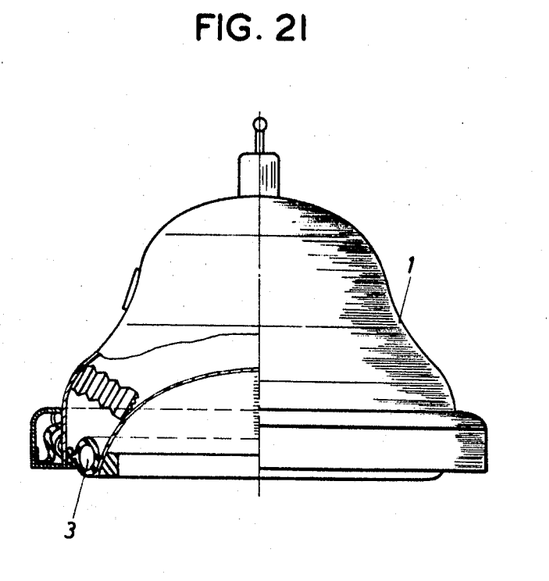
FIGURE 21 is a partial vertical sectional view of a modified hood.
Figure 22:
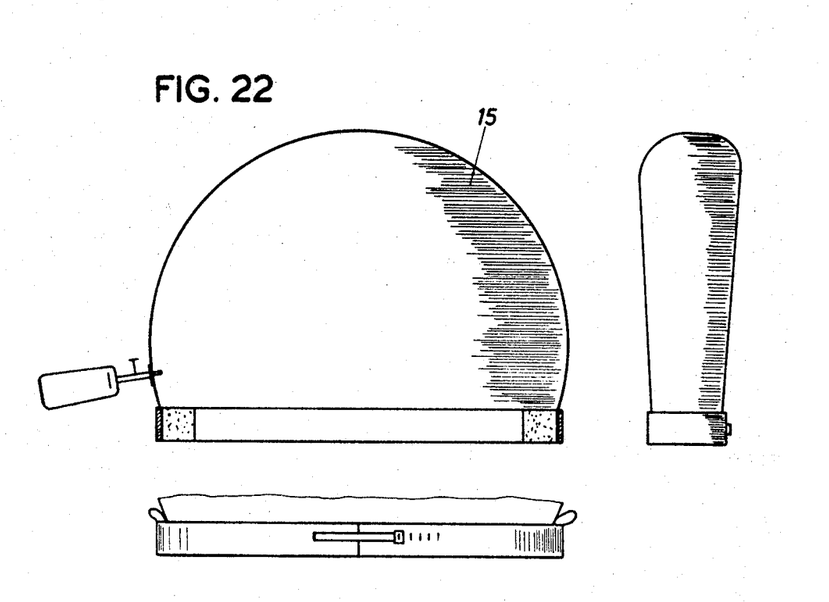
FIGURES 22 and 23 show further modifications.

Two passages supplying air to the hemispheres may be arranged for alternative or simultaneous inflation of the various hemispheres 4. Thus the scalp is massaged in such a manner as to promote blood flow.

A piston and cylinder device can be inserted into the air stream and actuated in an intermittent manner or pulsate so as to alternately over pressure the interior of the hood to about 50 mm. of mercury or to under pressure same as between 45 and 50 mm. of mercury. An underpressure within the hood would tend to draw the bloodstream towards the surface. In the same manner of course an overpressure within the hood would tend to drive the bloodstream away from the surface. The alternation or pulsation of the overpressure and underpressure in the hood with the massage of the inflatable members results in a well functioning system so as to make the hyperemia created on the scalp active.

Figure 4:
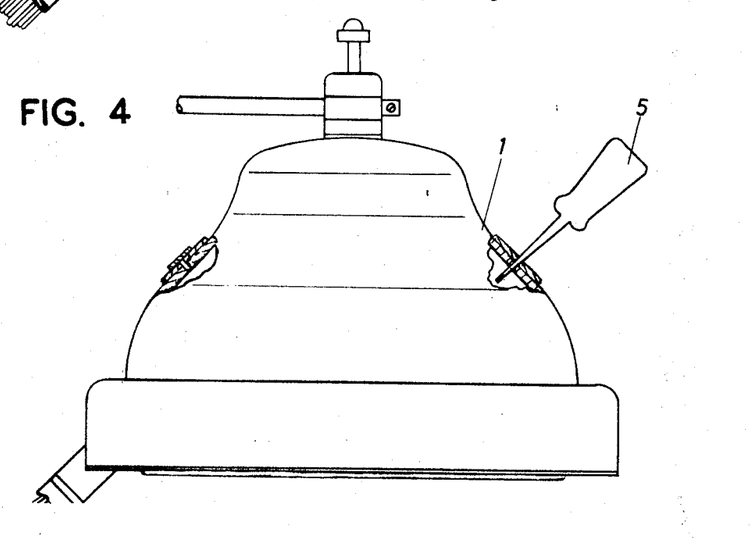
FIGURE 4 is a side view of the hood shown in section in FIGURE 3 with means to inject a fluid into the hood.

Fluid containers 5 are provided in fluid communication with the interior of the hood so that fluid treatment means can be sprayed directly unto the scalp through the hair growth during an underpressure or an overpressure of the hood.

The hood is so constructed that when it is in position on the head, it massages the scalp well on its most important hair growing parts. The places of massage may be divided into three groups:

(a) The massage around the head at the lower part of the hood by the hemispheres 4 on the tube 3 as described earlier.

Figure 3:
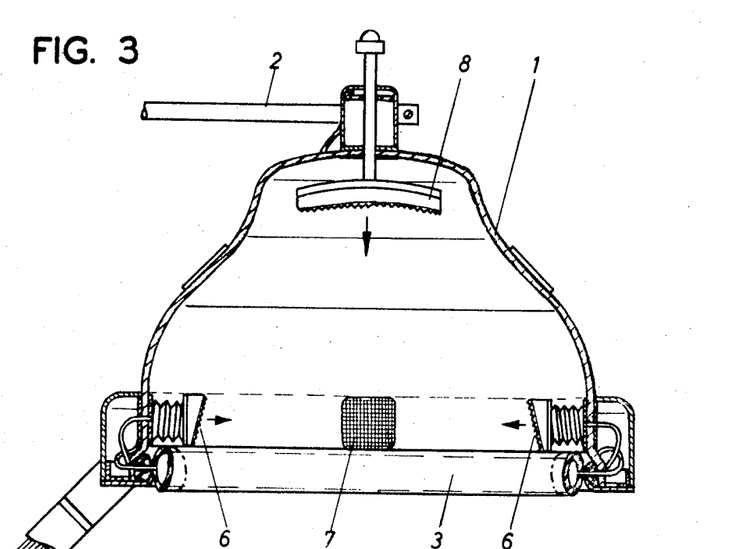
FIGURE 3 is a vertical sectional view of a hood in accordance with the invention.
Figure 5:
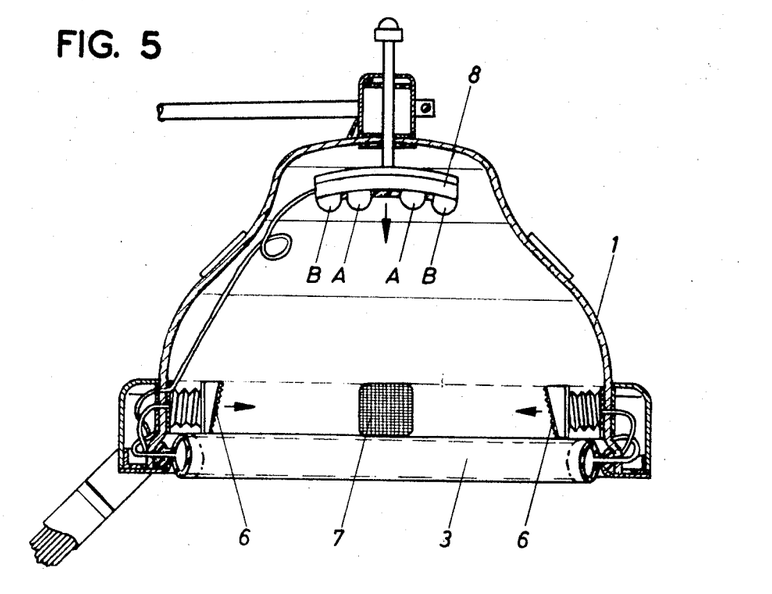
FIGURE 5 is a view corresponding to that shown in FIGURE 3 with a modified top massage member.
Figure 6:
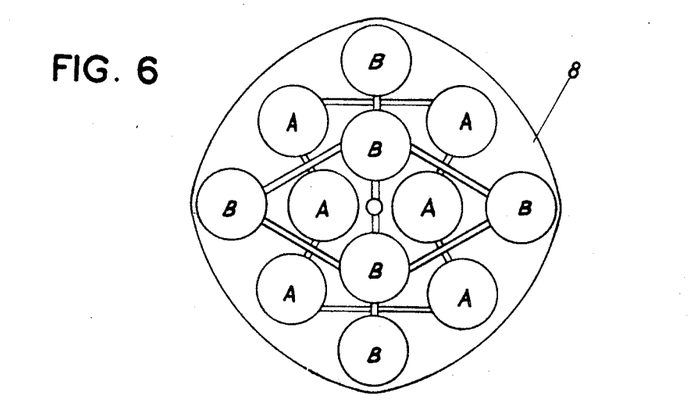
FIGURE 6 is a bottom view of the top massage member shown in FIGURE 5 and illustrating air passages for nonsynchronous inflation of groups of massage members.
Figure 7:
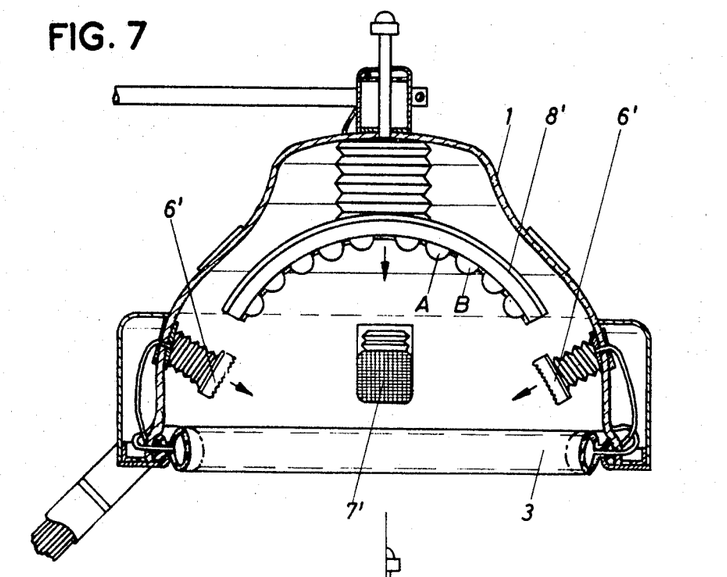
FIGURE 7 is a vertical sectional view of a hood in accordance with the invention with modified top massage members and with the side massage members spaced upwardly from the sealing ring.
Figure 8:
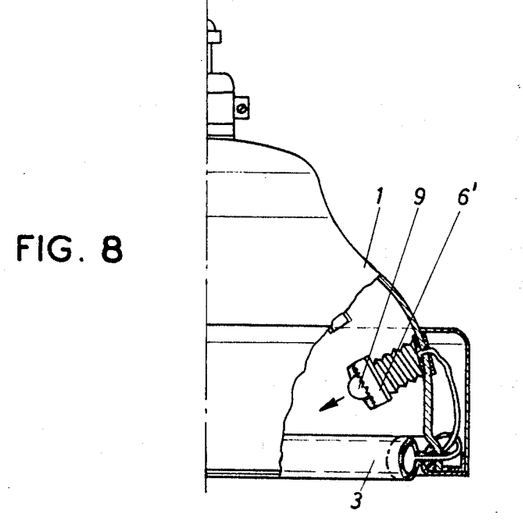
FIGURE 8 is a partial side view of the hood with a portion broken away to show a modification of the side massage members.

(b) By positioning massage members 6 and 7 (FIGURES 3 and 5) barely above the head tube, also around the head, the parts of the scalp are massaged in the direction of the crown which are particularly sensitive to hair loss and baldness. This lateral massage of the scalp is done by massage members 6 and 7 which alternately function around the head. The massage members 6 and 7 may also be provided with massage hemispheres 9 (FIGURE 8);

(c) The most sensitive parts of hair loss and baldness may probably be found at he parting and at the crown. These places are vigorously served with blood through a parting and crown massage, for example, with the help of inflatable and deflatable massage hemispheres A and B, which are effective from above through massage member 8 (FIGURES 3 and 5);

(d) A further massage effect tothe scalp is provided by the "capillary massage." By alternating under- and overpressure in the interior of the hood over the scalp the blood is drawn up through the fine capillary vessels of the scalp so that the scalp becomes alternately red and white. By the alternate filling and emptying of the peripheral blood vessels a very effectual massage is achieved without touching the scalp;

(e) By the air stream's intermittent overpressure and underpressure in the interior of the hood a further intensive movement of the peripheral blood circulation is achieved whereby the effect of most of the mentioned circulation effects is heightened.

(f) Lastly, the circulation is furthered by the effect of blood circulation preparations specially manufactured for this purpose.

Figure 23:
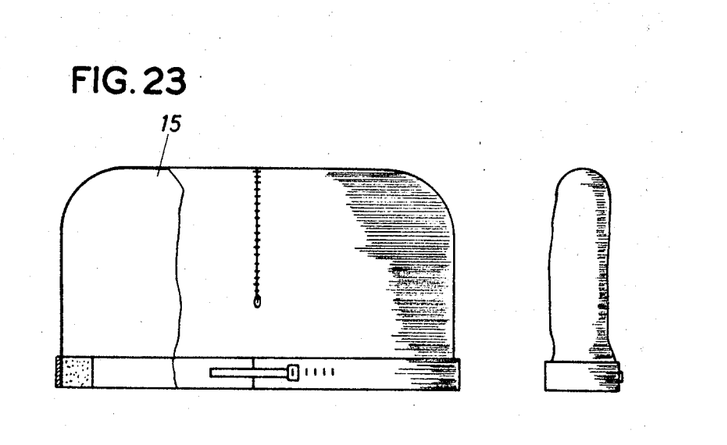

The feeding of the massage members is done pneumatically whereby the control of the process is done by a control mechanism. In FIGURE 23 there is shown an example of a program sequence. The device can be so arranged that single program sequences can be omitted.

Figure 24:
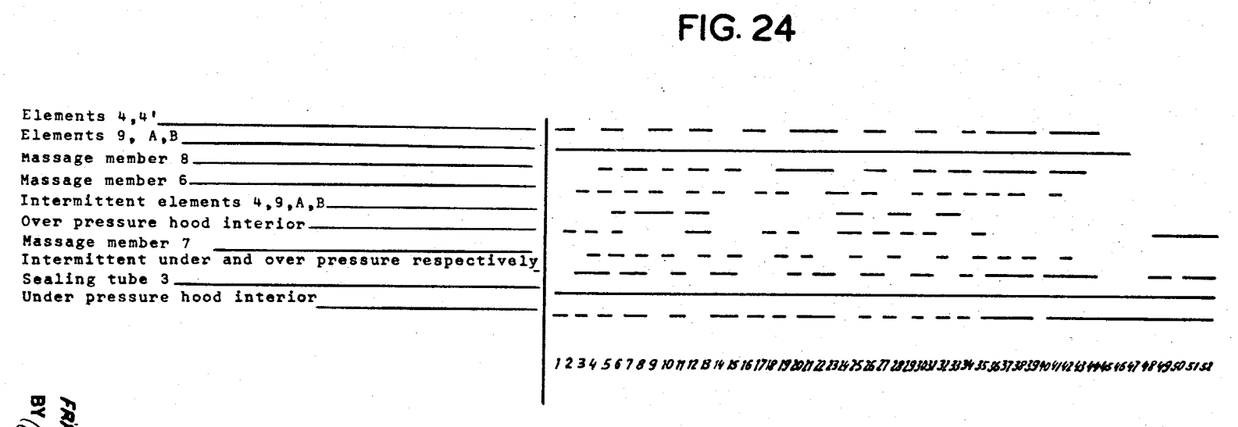
FIGURE 24 is a diagram of a program sequence for actuation of the massage members.
Figure 25:
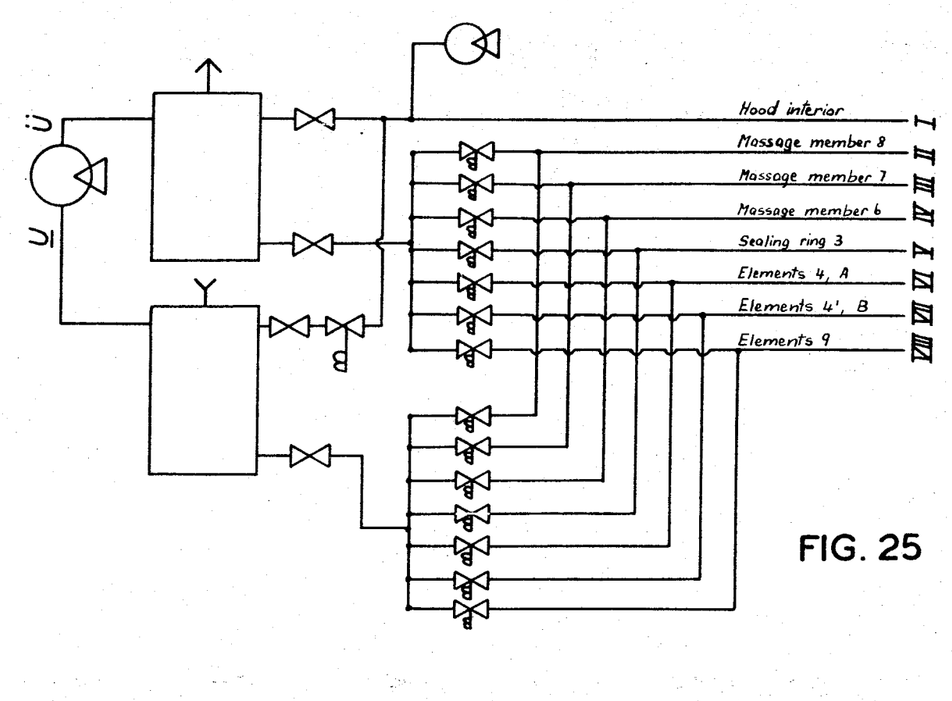
FIGURE 25 is a valving diagram of the air ducts.

The program control as well as the pressure pump and the under- and overpressure tanks are combined with servicing elements in a tool case. The valving of the air is achieved by magnetic valves in the usual manner as shown in FIGURE 24.

In some cases the hood may be provided with a watertight insertable member so that the entire scalp may be bathed, although, of course, in some cases, the hood may be used only for massage.

For a more complete description of the clincial advantages of the present invention and its operation reference may be had to German patent application No. Sch 37,793 filed Sept. 29, 1965, and German patent application No. Sch 38,759 filed Mar. 29, 1966.

I claim:

1. A device for treatment of the scalp comprising a hood, a sealing ring for the opening of the hood, a plurality of scalp massage members positioned within the hood and on the sealing ring, and separate air supply means for alternate massage elements.

2. A device for treatment of the scalp comprising a hood, a sealing ring for the opening of the hood, a plurality of massage members, some of the massage members being positioned on the side of the hood and others of the massage members being positioned under the top of the hood, at least a portion of the hood separable in the vertical section, and hinges positioned on the backside of the hood and a clamp closure provided on the front side of the hood so that the hood may be clamped around the head of the user

References Cited

UNITED STATES PATENTS

| | | | |
|---|---|---|---|
| 809,360 | 1/1906 | Dible | 128—38 |
| 2,103,949 | 12/1937 | Koehler. | |
| 2,856,918 | 10/1958 | Kingery et al. | 128—64 |
| 2,914,066 | 11/1959 | Gow | 128—66 |
| 3,044,473 | 7/1962 | Cover | 128—65 XR |
| 3,177,868 | 4/1965 | Wallace et al. | 128—65 |

L. W. TRAPP, Primary Examiner

U.S. Cl. X.R.

128—65